(12) United States Patent
Lochschmied et al.

(10) Patent No.: US 10,260,746 B2
(45) Date of Patent: *Apr. 16, 2019

(54) COMBUSTION DEVICE WITH A SIDE DUCT FOR MEASURING TURBULENT FLOWS

(71) Applicant: Siemens Aktiengesellschaft, Munich (DE)

(72) Inventors: Rainer Lochschmied, Rheinstetten-Forchheim (DE); Mike Schmanau, Malsch (DE); Bernd Schmiederer, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,192

(22) Filed: Oct. 2, 2017

(65) Prior Publication Data
US 2018/0094807 A1    Apr. 5, 2018

(30) Foreign Application Priority Data

Sep. 30, 2016  (EP) .................................. 16191977
May 31, 2017  (EP) .................................. 17173658

(51) Int. Cl.
*F23N 1/02*  (2006.01)
*F23D 14/60*  (2006.01)
(Continued)

(52) U.S. Cl.
CPC ......... *F23N 1/022* (2013.01); *F04D 29/4213* (2013.01); *F04D 29/4226* (2013.01);
(Continued)

(58) Field of Classification Search
None
See application file for complete search history.

(56) References Cited

U.S. PATENT DOCUMENTS 9,677,765  B2    6/2017  Metz et al.
2013/0302738  A1*  11/2013  Rennie .................... F23N 1/022
                                                              431/12
(Continued)

FOREIGN PATENT DOCUMENTS

DE    3703934 A1    8/1987  ............... F23N 1/02
DE    4337703 C1    3/1995  ............... F23N 1/02
(Continued)

OTHER PUBLICATIONS

Russian Office Action, Application No. 2017133736/06, 6 pages, dated May 22, 2018.
(Continued)

*Primary Examiner* — Harshad R Patel
(74) *Attorney, Agent, or Firm* — Slayden Grubert Beard PLLC

(57) ABSTRACT

The present disclosure deals with the measurement of flows of a fluid in a combustion device. For example, a combustion device may include a burner; a combustion chamber; a side duct; and a feed duct with a connector for the side duct including a mass flow sensor and a flow resistance element. The side duct and the feed duct have a fluid connection to one another. The mass flow sensor senses a mass flow through the side duct. The resistance element subdivides the side duct and includes an admittance surface. There is an outer area. The mass flow sensor projects into the side duct. The outlet of the side duct lets the fluid flow out of the side duct directly into the combustion chamber or directly into the outer area.

11 Claims, 5 Drawing Sheets

(51) Int. Cl.
*F23N 5/18* (2006.01)
*F04D 29/42* (2006.01)
*G05D 11/13* (2006.01)

(52) U.S. Cl.
CPC ............. *F23D 14/60* (2013.01); *F23N 5/184* (2013.01); *G05D 11/13* (2013.01); *F23N 2005/181* (2013.01); *F23N 2033/08* (2013.01)

(56) References Cited

U.S. PATENT DOCUMENTS

| | | | | |
|---|---|---|---|---|
| 2014/0261111 | A1* | 9/2014 | Cant | F23N 1/022 110/188 |
| 2015/0113998 | A1* | 4/2015 | Tatsumi | F02C 9/34 60/776 |
| 2016/0076767 | A1* | 3/2016 | Super | F23N 1/002 431/76 |
| 2017/0254536 | A1* | 9/2017 | Super | F23N 1/022 |

FOREIGN PATENT DOCUMENTS

| | | | | |
|---|---|---|---|---|
| DE | 19501749 A1 | 7/1996 | ............. | F23D 14/60 |
| DE | 102004055715 B4 | 1/2006 | ............. | F23D 14/60 |
| DE | 102010010952 A1 | 9/2011 | ............. | F23D 14/60 |
| EP | 2556303 B1 | 2/1916 | ............. | F23N 1/02 |
| EP | 1243857 A1 | 9/2002 | ............. | F04D 29/42 |
| EP | 1236957 B1 | 11/2006 | ............. | F23L 17/00 |
| FR | 2723630 A1 | 2/1996 | ............. | F23N 1/02 |
| GB | 1571906 A | 7/1980 | ............. | F23N 1/02 |
| JP | 3031856 B2 | 4/2000 | ............. | F23N 1/02 |
| RU | 2067259 C1 | 9/1996 | ............. | F23N 5/08 |
| RU | 2141604 C1 | 11/1999 | ............. | F23N 5/00 |
| RU | 2169311 C1 | 6/2001 | ............. | F23C 15/00 |
| RU | 2349838 C2 | 3/2009 | ............. | F23N 1/02 |

OTHER PUBLICATIONS

U.S. Non-Final Office Action, U.S. Appl. No. 15/722,246, 15 pages, dated Aug. 23, 2018.
Russian office Action, Application No. 2017133734/06, 12 pages, dated Aug. 14, 2018.
Russian Office Action, Application No. 2017133736/06, 12 pages, dated Sep. 27, 2018.
U.S. Final Office Action, U.S. Appl. No. 15/722,246, 17 pages, dated Dec. 5, 2018.

* cited by examiner

COMBUSTION DEVICE WITH A SIDE DUCT FOR MEASURING TURBULENT FLOWS

CROSS-REFERENCE TO RELATED APPLICATIONS

This application claims priority to EP Application No. 16191977.4 filed Sep. 30, 2016 and EP Application No. 17173658.0 filed May 31, 2017, the contents of which are hereby incorporated by reference in their entirety.

TECHNICAL FIELD

The present disclosure deals with the measurement of flows of a fluid in a combustion device. In particular, the present disclosure deals with the measurement of flows of fluids such as air in the presence of turbulence.

BACKGROUND

Changes of air temperature and air pressure cause air temperature and air pressure-dependent fluctuations of the air/fuel ratio λ to occur. Combustion devices are therefore typically set with an air surplus to ensure sufficient oxygen for full combustion. This measure serves to avoid unhygienic combustion. The disadvantage of setting combustion devices to an air surplus is a lower level of efficiency of the system.

Most systems use rotational speed sensors and air pressure switches for measuring the amount of air. Rotational speed sensors are not entirely sensitive to fluctuations in air temperature and air pressure. Air pressure switches are precise at a specific pressure. Given this, many systems include a number of switches to monitor air pressure at that number of pressures. Despite this, adjusting the entire operating range of the combustion device is as yet barely possible.

The occurrence of turbulence makes the problem even more difficult, since the signal of a flow sensor is greatly influenced by its installed position in the middle of a turbulent flow. As well as this, the turbulence causes the measurement signal to be very noisy.

European patent EP1236957B1 describes the adaptation of a burner-operated heating device to an air exhaust system using a pressure sensor/air mass sensor 28, which is arranged in the air feed 14 or exhaust gas venting system of a heating device. A regulating device 30 regulates a fan 26, starting from the signal of the sensor 28. To adapt the instantaneous air volume flow to a required air volume flow, an operating characteristic curve 40 is stored. To improve the regulation behavior with large differences in temperature and with respect to emergency operating characteristics a temperature sensor 35 is provided.

European patent EP2556303B1 describes a pneumatic composite having mass balancing with a venturi nozzle 5, which creates a vacuum, with a mass flow sensor 6 in an additional duct 7. An open-loop or closed-loop controller 9 regulates the speed of a fan 1 as a function of the signal of the sensor 6.

SUMMARY

The aim of the present disclosure is to improve the flow measurement in combustion devices, especially in the presence of turbulence. For example, a combustion device may comprise a burner (1) and a combustion chamber (2) that has a fluid connection to the burner (1). The device also includes a side duct (28), and a feed duct (11) with a connector (12) for the side duct (28). There may be at least one inlet (27) and one outlet, wherein the at least one inlet (27) of the feed duct (11) is embodied to let a fluid flow into the feed duct (11). The outlet of the feed duct (11) is embodied to let the fluid flow out of the feed duct (11) into the burner (1) of the combustion device. The side duct (28) comprises a mass flow sensor (13), an inlet, an outlet and at least one flow resistance element (14). The inlet of the side duct (28) is connected to the connector (12) of the feed duct (11) so that the side duct (28) and the feed duct (11) have a fluid connection to one another. The mass flow sensor (13) is embodied to detect a signal according to a mass flow (15) of the fluid through the side duct (28). The at least one flow resistance element (14) subdivides the side duct into a first section facing away from the mass flow sensor (13) and a second section facing towards the mass flow sensor (13) and has an admittance surface for the passage of the fluid between the first and the second section. The combustion device comprises an outer area, which is arranged outside of the side duct (28) and the feed duct (11) and the burner (1) and the combustion chamber (2). The mass flow sensor (13) projects into the side duct (28). The outlet of the side duct (28) is embodied to let the fluid flow out of the side duct (28) directly into the combustion chamber (2) or directly into the outer area.

In some embodiments, the connector (12) of the feed duct (11) comprises a Pitot probe. The Pitot probe comprises a first section with at least one inlet opening (31) and a second section with an outlet, and the first and the second section of the Pitot probe have a fluid connection to one another. The first section of the Pitot probe projects into the feed duct (11) and the at least one inlet (31) of the Pitot probe is embodied to let the fluid flow in out of the feed duct (11) into the Pitot probe. The outlet of the Pitot probe is embodied to let the fluid flow out of the Pitot probe into the side duct (28). The at least one inlet (31) of the Pitot probe has an admittance surface for the passage of the fluid between feed duct (11) and the first section of the Pitot probe.

In some embodiments, the at least one inlet opening (31) of the Pitot probe has a number of openings each for the passage of the fluid between feed duct (11) and the first section of the Pitot probe and the diameter of each individual opening is dimensioned so that suspended particles in a mass flow (5) in the feed duct (11) do not get into the second section of the Pitot probe.

In some embodiments, the side duct (28) additionally has a bypass duct (29) and has at least one second flow resistance element (19), wherein the at least one second flow resistance element (19) subdivides the side duct into a third section facing towards the at least one flow resistance element (14) and a fourth section facing away from the at least one flow resistance element (14). The bypass duct (29) branches off from the section of the side duct (28) so that the bypass duct (29) has a fluid connection to the third section.

In some embodiments, the mass flow sensor (13) projects into the bypass duct (29).

In some embodiments, the bypass duct (29) has a third flow resistance element (20) and the third flow resistance element (20) is arranged in the bypass duct (29).

In some embodiments, the side duct (28) additionally comprises an outlet, which is embodied to let a fluid flow out of the side duct (28).

In some embodiments, the combustion device additionally comprises a combustion chamber (2), which is connected to the burner (1) and the outlet of the side duct (28) has a fluid connection to the combustion chamber (2) of the combustion device.

In some embodiments, the combustion device has a combustion chamber (2), which is connected to the burner (1), and comprises an environment, which surrounds the burner (1) and the combustion chamber (2) from the outside, wherein the outlet of the side duct (28) has a fluid connection to the environment of the combustion device.

In some embodiments, the outlet of the side duct (28) has a fluid connection to the feed duct (11).

In some embodiments, the outlet of the side duct (28) is additionally embodied to let a fluid flow into the side duct (28) and the inlet of the side duct (28) is additionally embodied to let a fluid flow out of the side duct (28).

In some embodiments, combustion device additionally comprising a signal-processing device, which comprises a lowpass filter, which is connected to the mass flow sensor (13), wherein the lowpass filter is embodied to filter the signal of the mass flow sensor (13). In some embodiments, the lowpass filter is of an adaptive design.

In some embodiments, there is a second side duct (28) with a mass flow sensor (13) and an inlet. The inlet of the second side duct (28) is connected to a connection selected from either the connector (12) of the feed duct (11), or a further connector, which includes the feed duct (11), so that the second side duct (28) and the feed duct (11) have a fluid connection to one another. The mass flow sensor (13) of the second side duct (28) projects into the second side duct (28) and is embodied to detect a signal according to a mass flow (15) of the fluid through the second side duct (28).

In some embodiments, there is a fan (3) and a closed loop and/or open-loop control and/or monitoring device (16). The closed-loop and/or open-loop control and/or monitoring device (16) is connected to the mass flow sensor (13) of the at least one side duct (28) of the combustion device.

BRIEF DESCRIPTION OF THE DRAWINGS

Various details become accessible to the person skilled in the art on the basis of the following detailed description. The individual embodiments are not restrictive in this description. The drawings, which are enclosed with the description, can be described as follows.

DETAILED DESCRIPTION

Figure 1:
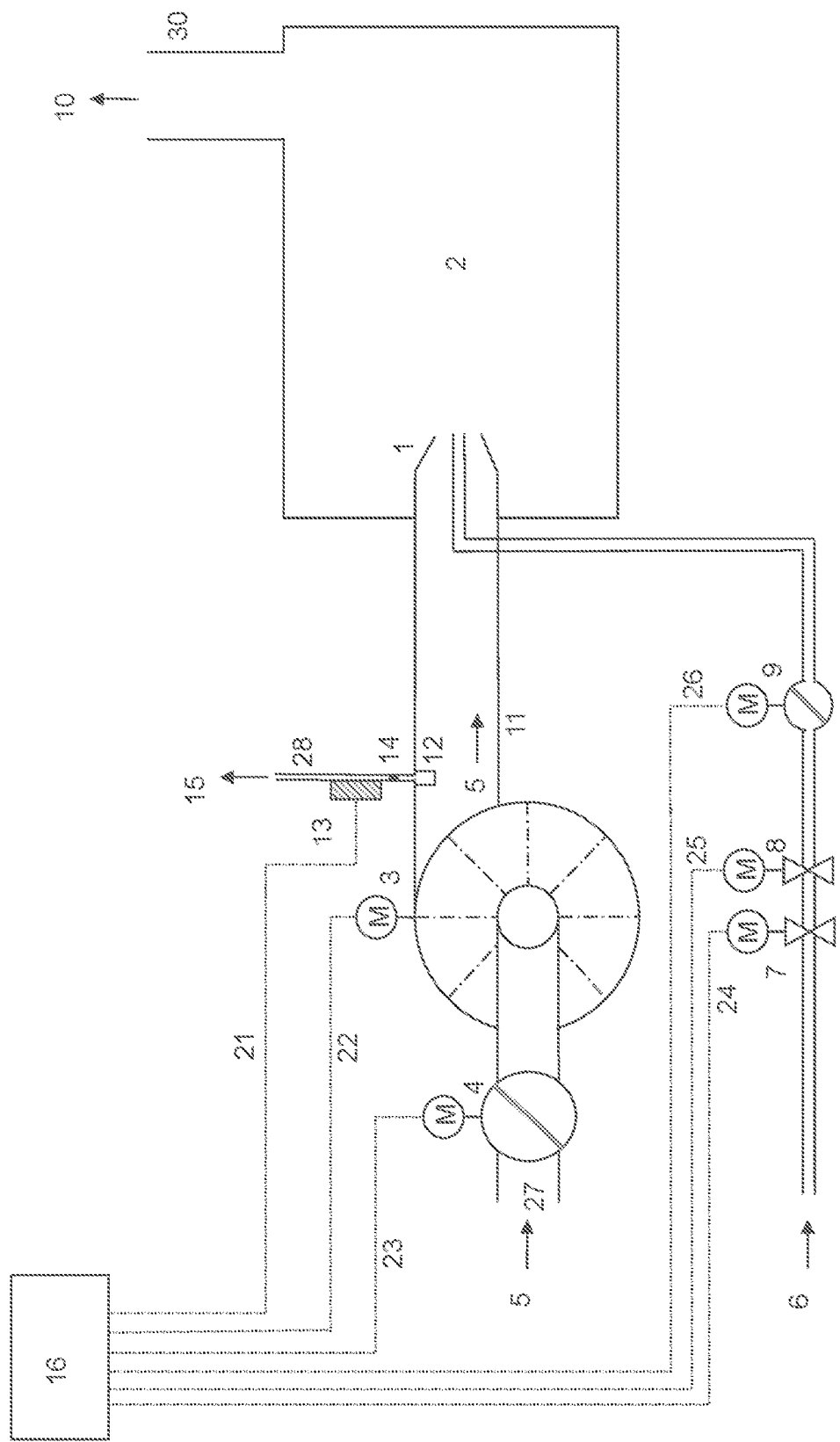
FIG. 1 shows a schematic of a system with a combustion device, wherein the flow of a fluid in an air feed is measured.

The aforementioned method and the aforementioned device allow the safety margin of the fuel/air ratio $\lambda$ for an unhygienic combustion to be smaller. Such a safety margin is used to account for the natural fluctuations of pressure and temperature over time. As a result of the reduced safety margin, an overall improved level of efficiency of the combustion device is produced.

In some embodiments, the opening of at least one flow resistance element is adjusted via an actuator. In some embodiments, the actuator is supplied with energy for adjusting the flow resistance element via an (eight-wire) computer network cable with energy transmission integrated into the cable.

In some embodiments, a first and a second flow resistance element are used. A pressure divider is constructed on the basis of the first and the second flow resistance element. A side duct is arranged in the fluid connection to the section between the two flow resistance elements. Arranged in that side duct is the mass flow sensor.

In some embodiments, at least one opening of the side duct has a fluid connection to the environment of the combustion device, so that there is a fluid path between the feed and/or outlet and the environment (area outside the combustion device).

In some embodiments, the Pitot tube has a first and a second chamber. The first chamber has a fluid connection to the feed and/or outlet. The first and the second chamber have a fluid connection to each other and to the side duct. The side duct narrows the flow cross-section at this point. The mass flow sensor is located in the side duct. In some embodiments, the second chamber also has a fluid connection to the feed and/or outlet.

In some embodiments, the mass flow sensor comprises an anemometer and a reference temperature sensor, wherein the anemometer is operated with constant power and/or with constant voltage and/or with constant current. In some embodiments, the mass flow sensor comprises an anemometer and a reference temperature sensor, wherein the anemometer is operated with a constant temperature.

In some embodiments, the noise in the signal of the mass flow sensor generated by turbulence is filtered on the basis of a (electronic, digital) circuit. In some embodiments, filtering is done on the basis of a moving average value filter and/or on the basis of a filter with a finite pulse response and/or on the basis of a filter with an infinite pulse response and/or on the basis of a Chebyshev filter.

In some embodiments, the method and/or the device meet safety requirements. To this end the mass flow sensor may be designed with (dual) redundancy. In some embodiments, the results of the two channels will be compared with one another in respect of checking the plausibility of the signals. Furthermore there is provision to check the signals of each individual sensor for plausibility (on the basis of an evaluation circuit). In some embodiments, the evaluation circuit also checks itself for error-free functioning. To this end the evaluation circuit may include (dual) redundancy with result comparison and/or can generate test signals for function testing of the evaluation circuit.

In some embodiments, the mass flow sensor is supplied with energy on the basis of an (eight-wire) computer network cable with energy transmission integrated into the cable. In some embodiments, there is a means to measure flows with a data transmission (and energy supply) by a two-wire, bidirectional bus, e.g. a CAN bus.

FIG. 1 shows a system comprising a burner 1, a heat consumer 2, a fan 3 with a speed that can be set, and a flap 4 with motorized adjustment. The flap 4 with motorized adjustment is arranged after the air entry 27. The heat consumer 2 (heat exchanger) can be a hot water vessel for example. The throughflow (particle flow and/or mass flow) 5 of the fluid air can be set in accordance with FIG. 1 both by the flap 4 with motorized adjustment and also by specifying the rotational speed 22 of the fan.

In the absence of the flap 4, the air throughflow 5 can also be adjusted just by setting the speed of the fan 3. Pulse width modulation comes into consideration for adjusting the speed of the fan 3 for example. In some embodiments, the motor of the fan 3 is connected to a converter. The speed of the fan 3 is thus adjusted via the frequency of the converter. In some embodiments, the fan runs at a fixed, invariable speed. The air throughflow 5 is then defined by the position of the flap 4. In addition further actuators are possible, which change the air throughflow 5. In such cases an adjustment of the burner nozzle or an adjustable flap in the waste gas vent duct can be involved.

In some embodiments, the throughflow 6 (for example particle flow and/or mass flow) of the fluid fuel is set by a fuel flap 9. In some embodiments, the fuel flap 9 is a valve (with motorized adjustment).

In some embodiments, combustible gases such as natural gas and/or propane gas and/or hydrogen are used as fuel. A liquid fuel such as heating oil is also considered as a fuel for example. In this case the flap 9 may be replaced by an oil pressure regulator with motorized adjustment in the return of the oil nozzle. The safety shutdown function and/or closing function are implemented by the redundant safety valves 7-8. In some embodiments, the safety valves 7-8 and the fuel flap 9 are realized as an integrated unit. In some embodiments, the burner 1 is a combustion engine. In particular a combustion engine of a system with power-heat coupling comes into consideration.

In some embodiments, fuel is mixed into the flow of air 5 in and/or before the burner 1. The mixture is burned in the combustion chamber of the heat consumer 2. The heat is transported onwards in the heat consumer 2. For example, heated water is taken away via a pump to heating elements and/or in industrial firing systems an item is heated (directly). The exhaust gas flow 10 is vented via an exhaust gas path 30, for example a chimney.

In some embodiments, a closed-loop and/or open-loop control and/or monitoring device 16 coordinates all actuators so that the correct throughput 6 of fuel is set via the setting of the flap 9 for the corresponding air throughflow 5, which means the throughflow 5 of air (mass flow and/or particle flow) in duct 11 for each point of the burner power. Thus, the desired fuel/air ratio $\lambda$ is produced. In some embodiments, the closed-loop and/or open-loop control and/or monitoring device 16 includes a microcontroller.

To this end the closed-loop and/or open-loop control and/or monitoring device 16 sets the fan 3 via the signal 22 and the air flap 4 via the signal 23 to the values stored in the closed-loop and/or open-loop control and/or monitoring device 16 (in the form of a characteristic curve). In some embodiments, the closed-loop and/or open-loop control and/or monitoring device 16 comprises a (non-volatile) memory. Those values are stored in the memory. The setting of the fuel flap 9 is specified via the signal 26. In operation the safety shut-off valves 7, 8 are set via the signals 24, 25.

If faults are to be uncovered in the flap 4, 9 and/or in the fan 3 (for example in the (electronic) interface or control device of the flap or of the fan), then this can be done by a safety-oriented feedback of the position of the flap 4 via the (bidirectional) signal line 23 for the flap 4 and/or via the (bidirectional) signal line 26 for the flap 9. A safety-oriented position message can be realized for example via redundant position generators. If a safety-oriented feedback about the rotational speed is required, this can be done via the (bidirectional) signal line 22 using (safety-oriented) rotational speed generators. Redundant rotational speed generators can be used for this purpose for example and/or the measured speed can be compared with required speed. The activation and feedback signals can be transferred via different signal lines and/or via a bidirectional bus.

In some embodiments, fitted before the burner is a side duct 28. A small amount of outflowing air 15 flows outwards through the side duct 28. In some embodiments, the air 15 flows out in this case into the space from which the fan 3 sucks in the air. In some embodiments, the outflowing air 15 flows out into the firing space of the heat consumer 2. In some embodiments, the air flows back into the air duct 11. In this case a flow resistance element is arranged (at least locally) in the air duct 11 between tapping off point and return. The side duct 28, together with the burner 1 and the waste gas path 30 of the heat consumer 2, form a flow divider. For a defined flow path through burner 1 and waste gas path 30, for a (reversibly unambiguous) value of the air flow 5 an associated value of an air flow 15 flows out through the side duct 28. The flow path through burner 1 and waste gas path 30 must only be defined in such cases for each point of the burner power. It can thus vary over the burner power (and thus over the air throughflow).

In some embodiments, the side duct 28, depending on pressure conditions, can be both an outflow duct and also an inflow duct in relation to the air duct 11. In some embodiments, a flow resistance element (in the form of a diaphragm) 14 is fitted in the side duct 28. With the flow resistance element 14 the amount of outflowing air 15 of the flow divider is defined. The function of the diaphragm 14 as a defined flow resistor can also be realized by a small tube of defined length (and diameter). The function of the diaphragm 14 can also be realized by using a laminar flow element or by another defined flow resistor.

In some embodiments, the admittance surface of the flow resistance element 14 can be adjusted by a motor. To avoid and/or remedy blockages caused by suspended particles, the admittance surface of the flow resistance element 14 can be adjusted. In particular, the flow resistance element 14 can be opened and/or closed. The admittance surface of the flow resistance element may be adjusted multiple times in to avoid and/or to remedy blockages.

The amount of flow 15 in the side duct 28 depends on the admittance surface of the flow resistance element 14. Therefore, the value of the air flow 5 is stored for each admittance surface of flow-resistance element 14 via characteristic values stored in the non-volatile memory. This enables the air flow 5 to be determined.

With this arrangement, the throughflow 15 (particle flow and/or mass flow) through the side duct 28 is a measure for the air flow through the burner. In this case influences as a result of changes in the density of the air for example are compensated for by changes in the absolute pressure and/or the air temperature through the mass flow sensor 13. Normally the flow 15 is very much smaller than the air flow 5. Thus, the air flow 5 is (in practice) not influenced by the side duct 28. In some embodiments, the (particle and/or mass) flow 15 through the side duct 28 is smaller by at least a factor of 100, at least a factor of 1000, and/or by at least a factor of 10000 than the (particle and/or mass) flow 5 through the air duct 11.

Figure 2:
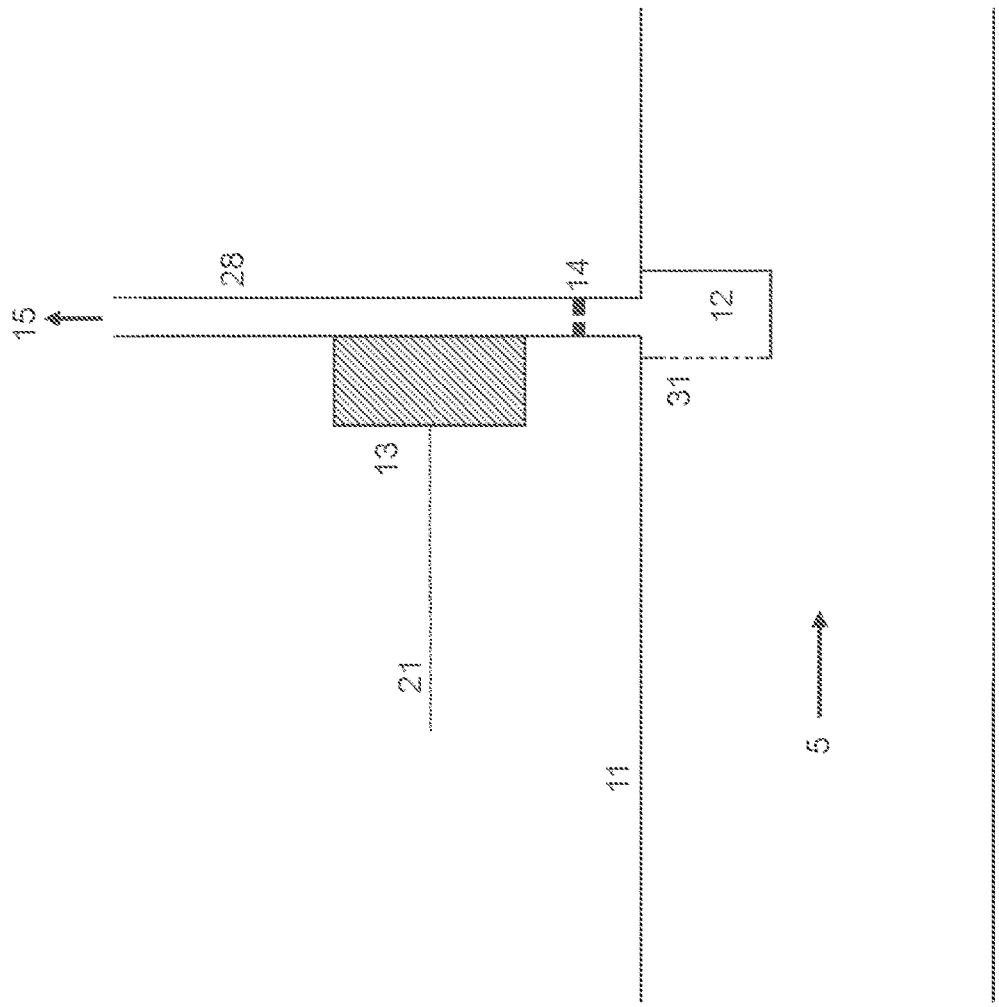
FIG. 2 shows the side duct in a detailed schematic.

FIG. 2 shows the section in the area of the side duct 28 in an enlarged view. The value of the flow 15 in side duct 28 is detected with the aid of a mass flow sensor 13. The signal of the sensor is transmitted via the signal line 21 to the closed-loop and/or open-loop control and/or monitoring device 16. In the closed-loop and/or open-loop control and/or monitoring device 16 the signal is mapped to a value of the flow 15 through the side duct 28 and/or of the air flow 5 through the air duct 11. In some embodiments, a signal-processing device is present at the location of the mass flow sensor 13. The signal-processing device has a suitable interface for transferring a signal processed (for a value of the air flow and/or flow 15) to the closed-loop and/or open-loop control and/or monitoring device 16.

In some embodiments, sensors such as the mass flow sensor 13 allow measurement at high flow speeds, specifically in conjunction with combustion devices in operation. Typical values of such flow speeds lie in ranges between typically 0.1 m/s and 5 m/s, 10 m/s, 15 m/s, 20 m/s, or even 100 m/s. Mass flow sensors, which are suitable for the present disclosure, are for example OMRON® D6F-W or SENSOR TECHNICS® WBA-type sensors. The usable range of these sensors typically begins at speeds between 0.01 m/s and 0.1 m/s and ends at a speed of for example 5 m/s, 10 m/s, 15 m/s, 20 m/s, or even 100 m/s. In other words, lower limits such as 0.1 m/s can be combined with upper limits such as 5 m/s, 10 m/s, 15 m/s, 20 m/s, or even 100 m/s.

Regardless of whether the signal processing is done in the closed-loop and/or open-loop control and/or monitoring device 16 or at the location of the mass flow sensor 13, the signal-processing device can contain a filter. The filter averages over fluctuations of the signal, which are caused by turbulences. A suitable filter for this purpose may include a moving average value filter, a filter with a finite pulse response, a filter with an infinite pulse response, a Chebyshev filter, etc. In some embodiments, the filter is designed as a (programmable) electronic circuit.

In some embodiments, a (electronic) filter smoothes the measurement signal. In some embodiments, the filter can be of an adaptive design. To do this, the measurement signal is averaged over a long, maximum integration time (for example 2 seconds to 5 seconds) as a comparison value with a moving average value filter. If a measurement value deviates from the average value and/or from the required value outside a predetermined band, a jump in the required value is assumed. The measurement value is now used directly as the actual value. Thus the regulation circuit reacts immediately with the sample rate of the regulation circuit.

The combination of Pitot probe 12, flow resistance element 14 and filter is advantageous. The filter allows frequency parts of the fluctuations of the signal of the mass flow sensor 13 to be compensated for, which are barely able to be compensated for via Pitot probe 12 and/or flow resistance element 14. In some embodiments, the Pitot probe 12 integrates pressure fluctuations of the mass flow 5 in the feed duct 11 of greater than 10 Hz and/or of greater than 50 Hz. In some embodiments, the flow resistance element 14 damps pressure fluctuations of the mass flow 5 in the feed duct 11 by a factor of 5, and/or by more than a factor of 10 or even by more than a factor of 40. Complementarily thereto the filter integrates fluctuations in the range of greater than 1 Hz, and/or than 10 Hz.

If the measurement values again lie within the defined band, the integration time is increased step-by-step with (each) sampling of the regulation circuit. The value integrated in this way is used as the actual value. This is done until such time as the maximum integration time is reached. The regulation circuit will now be stationary. The value averaged in this way is now used as the actual value. The disclosed method makes possible an exact, stationary measurement signal at maximum dynamic.

In some embodiments, individual or all signal lines 21-26 include an (eight-wire) computer network cable with (or without) energy transmission integrated into the cable. In some embodiments, the units connected to the signal lines 21-26 communicate not only via the signal lines 21-26, but they are also supplied with energy for their operation via separate signal lines 21-26. Ideally power of up to 25.5 Watts can be transmitted through the signal lines 21-26. In some embodiments, the signals can also be transmitted via a two-wire, bidirectional bus, e.g. a CAN bus.

The form of measuring a flow in a side duct 28 illustrated in FIG. 2 may be used with combustion devices. The air flow 5 in the air duct 11 between fan 3 and burner 1 is (in many cases) turbulent. The flow fluctuations resulting from turbulence in such cases lie in the same order of magnitude as the averaged value of the air flow 5. This means that a direct measurement of the value of the air flow 5 becomes significantly more difficult. The flow fluctuations occurring in the side duct 28 turn out to be much smaller than the flow fluctuations in the air duct 11 caused by the fan 3. Thus, with the arrangement shown in FIG. 2, a significantly improved signal-to-noise ratio of the signal of the mass flow sensor 13 is obtained. The side duct 28 may be constructed so that (practically) no relevant macroscopic flow profile of the flow 15 is obtained. In the side duct 28, the flow 15 may slide in a laminar manner over the mass flow sensor 13. The Reynolds number $Re_D$ inter alia may be used to divide the mass flow 15 of a fluid in the side duct 28 with diameter D into laminar or turbulent. In some embodiments, flows with Reynolds numbers $Re_D<4000$, with $Re_D<2300$, and/or with $Re_D<1000$, count as laminar.

In some embodiments, the admittance surface of the flow resistance element 14 is dimensioned so as to let a defined, e.g. laminar, flow profile (of a mass flow 15) arise in the side duct 28. A defined flow profile (of the mass flow 15 of a fluid) in the side duct 28 is characterized by a defined velocity distribution of a mass flow 15 as a function of the radius of the side duct 28. The mass flow 15 thus does not run chaotically. A defined flow profile is unique for each flow amount 15 in the side duct 28. With a defined flow profile the flow value measured locally at the mass flow (sensor) is representative for the flow amount in the side duct 28. It is thus representative for the air flow 5 in the feed duct 11. A defined flow profile in the side duct 28 (of a mass flow 15) is preferably not turbulent. In some embodiments, a defined flow profile (of a mass flow 15) in the side duct 28 can have a (parabolic) speed distribution as a function of the radius of the side duct 28.

In the arrangement in accordance with FIG. 2 however an indirect pressure measurement is involved. By contrast with a pressure measurement, changes in the mass flow as a result of a temperature change are detected as well. The device disclosed here is also capable of compensating for temperature changes with the aid of the closed-loop and/or open-loop control and/or monitoring device 16. The mass flow sensor 13 is easy to install on practically any system on the pressure side.

In some embodiments, to reduce the influence of turbulences even further, the flow 15 can be directed over the Pitot probe 12 in the side duct 28. The Pitot probe 12 is arranged in the air duct 11. The Pitot probe 12 is designed in the form of a tube with any given cross section (for example round, angular, triangular, trapezoidal, preferably round). The end of the tube 12 in the direction of the main air flow 5 may be closed or greatly narrowed. The end of the tube, which projects out of the tube with the main flow 5, forms the beginning of the side duct 28. That end opens out into the side duct 28. Made laterally on the side of the Pitot probe 12 in the direction from which the air flow 5 comes are a number of inlet openings (for example slots or holes) 31.

Through the opening 31 a fluid, such as for example air from the air duct 11 can enter into the Pitot probe 12. Thus the Pitot probe 12 has a fluid connection via the openings 31 with the air duct 11. The total surface of the openings 31 (the cross section of the openings 31 through which fluid can flow) is far greater than the admittance surface of the flow resistance element 14. Thus the admittance surface of the flow resistance element 14 is (in practice) determining for the value of the air flow 15 through the side duct 28. In some embodiments, the total cross section of the openings 31 through which fluid can flow is greater at least by a factor of 2, at least by a factor of 10, and/or at least by a factor of 20, than the admittance surface of the flow resistance element 14.

In some embodiments, there is a small surface area for the total surface of the openings 31 compared to the cross-section of the Pitot probe 12. This means that fluctuations of the turbulent main flow 5 have (in practice) no effect. In the tube of the Pitot probe a calmed constriction pressure is established. In some embodiments, the total cross-section of the openings 31 through which fluid can flow is smaller at least by a factor of 2, at least by a factor of 5, and/or at least by a factor of 10, than the cross-section of the Pitot probe 12.

A further advantage of the arrangement lies in the fact that suspended particles and/or droplets are very unlikely to get into the side duct 28. Through the significantly lower speeds of the air in the side duct 28 and through the constriction pressure in the Pitot probe 12 suspended particles and/or droplets will continue to be swirled in the turbulent main flow 5. Larger solid particles can barely get into the Pitot probe 12 because of the constriction pressure and because of the openings 31. They will be swirled past the Pitot probe 12. To this end the individual openings of the inlet 31 have diameters of less than 5 mm, of less than 3 mm, and/or of less than 1.5 mm.

In some embodiments, the openings 31 along the Pitot probe 12 are dimensioned such that the average value of the constriction pressure is formed over a macroscopic flow profile of the air flow 5 in the Pitot probe 12. In some embodiments, a Pitot probe 12 of defined length smoothes a macroscopic flow profile of the air flow inside the tube and compensates for the respective flow conditions for different designs of air duct 11 via a length of the Pitot probe adapted to the air duct 11. Such compensation applies especially to air ducts with different diameters.

Figure 3:
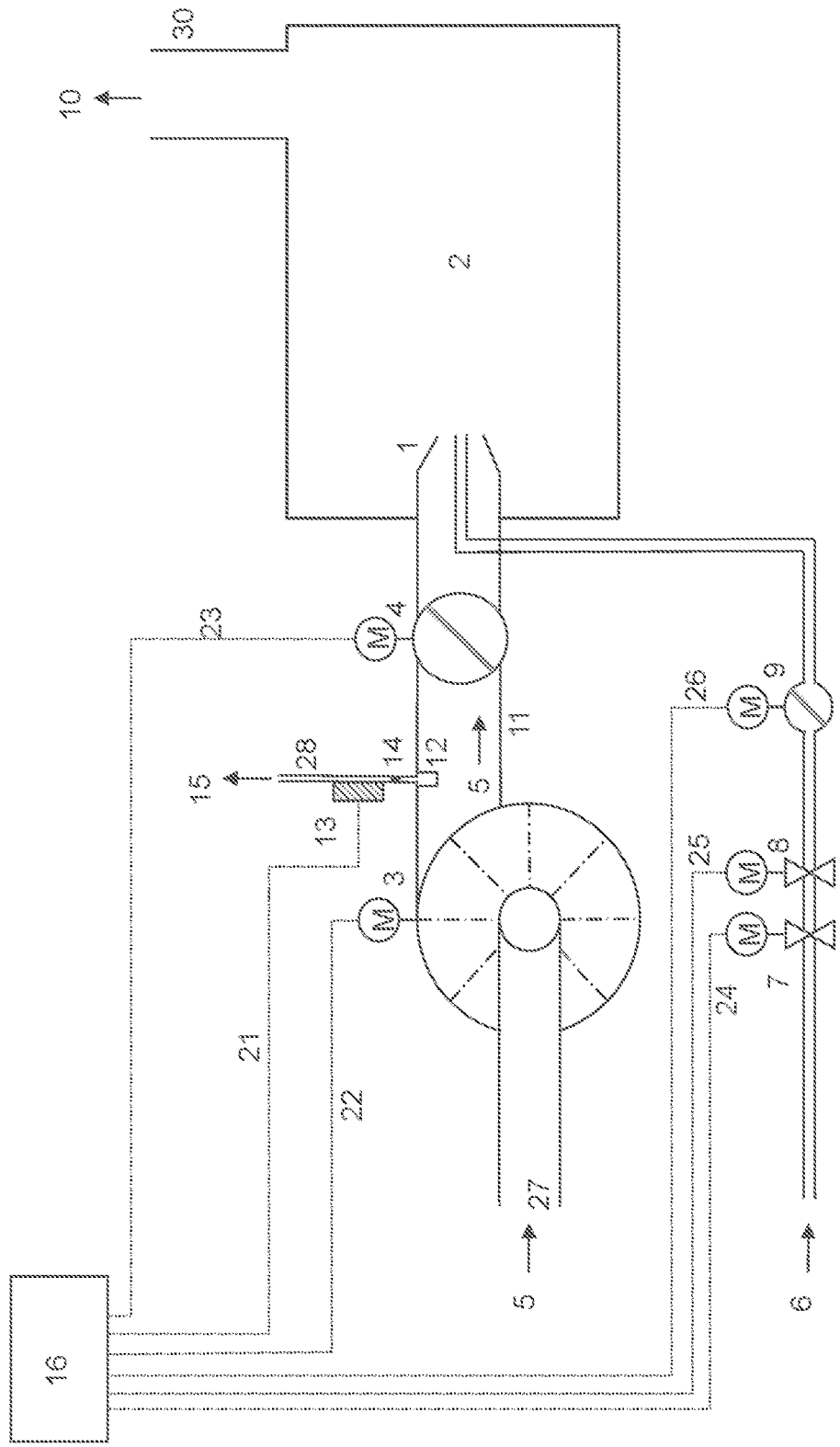
FIG. 3 shows a schematic of a system with a combustion device and with an air flap arranged on the pressure side.

As a modified form compared to FIG. 1, FIG. 3 shows a system with an air flap 4 adjusted by a motor. The air flap 4 is arranged downstream of the fan 3. The air flap 4 is also arranged downstream of the side duct 28. The system for FIG. 3 allows the definition of a position of the air flap 4 and/or of the speed of the fan 3 for each point of the burner power. This produces (reversibly unambiguously) from each value of air throughflow 5 and the (fed back) setting of the air flap 4 and/or the (fed back) speed of the fan 3, a flow value 15 in the side duct 28.

Figure 4:
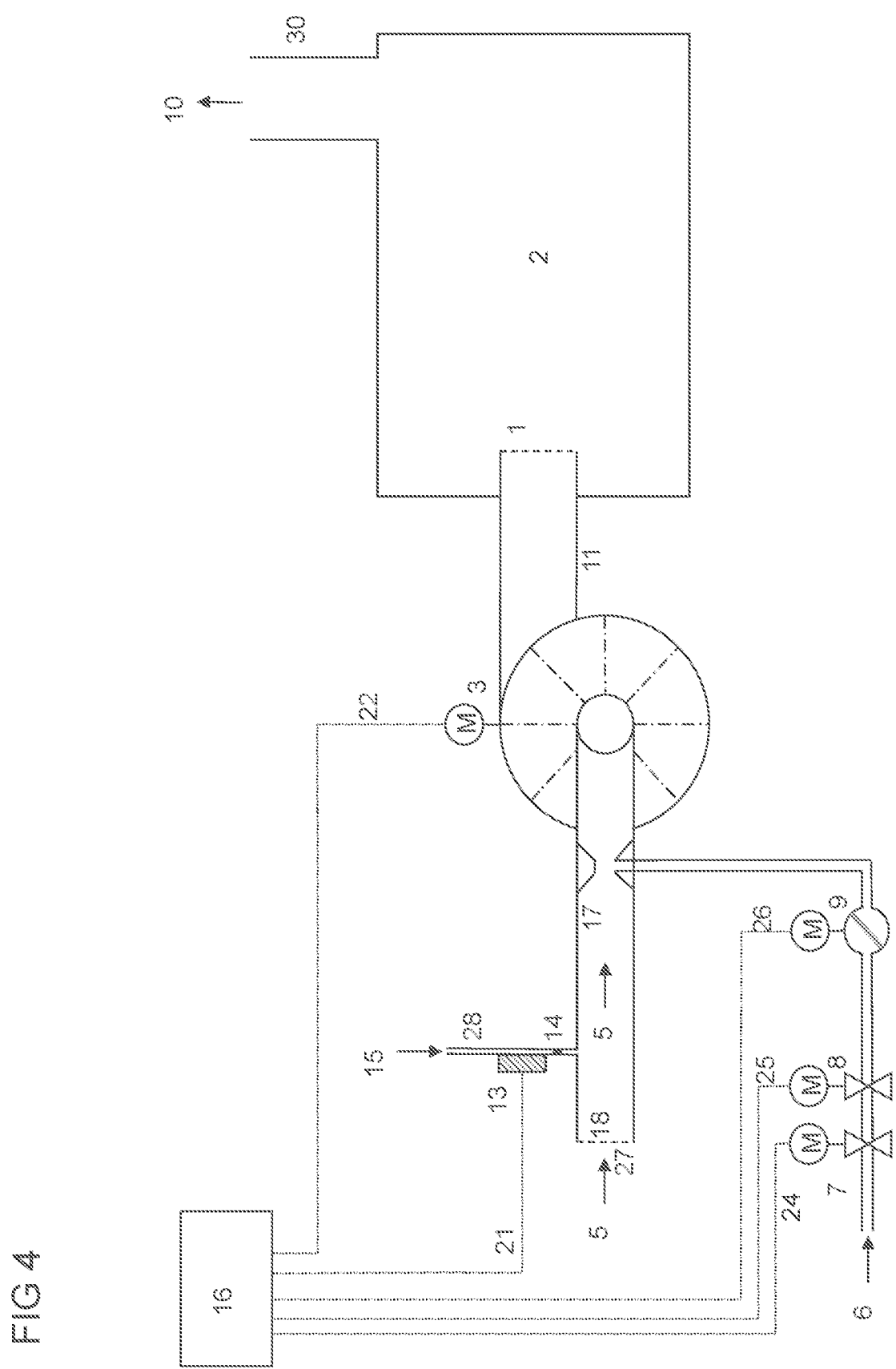
FIG. 4 shows a schematic of a system with a combustion device and with a mixing device before the fan.

As a modified form compared to FIG. 1 and FIG. 3, FIG. 4 shows a system with a mixing device 17 before the fan 3. By contrast with the systems from FIG. 1 and from FIG. 3, fuel is not mixed with air at the burner 1. Instead fuel is mixed-in with the air flow 5 before the fan 3 using a mixing device 17. There is accordingly the fuel/air mixture in the fan 3 and in the duct 11. The fuel/air mixture is subsequently burned in the burner 1 in the firing space of the heat consumer 2.

By contrast with FIG. 1 and FIG. 3, the air 15 flows in on the suction side over the mass flow sensor 13. The fan 3 creates a vacuum at this location. In other words, the side duct 28 is an inflow duct. The side duct 28 may be arranged before the mixing device 17. This means that any possible vacuum generated by the mixing device 17 has no effect on the throughflow 15 (particle flow and/or mass flow) through the side duct 28.

In some embodiments, changes in the amount of gas as a result of adjustments of the fuel flap 9 with motorized adjustment do not influence the throughflow 15 through the side duct 28. The mixing device 17 (in practice) no longer has any effect in the area of the side duct 28. Should the vacuum in the feed of the fan 3 not suffice, then a defined flow-resistance element can be created with a flow resistance element 18 at the entry 27 of the fan feed. Together with the flow resistance element 14 in the side duct 28 a flow divider is realized.

In FIG. 4 the fluid flow 5 can only be set via the fan 3 with the aid of the signal line 22. A flap with motorized adjustment can be installed in addition. Such a flap is arranged on the pressure side or the suction side in relation to the fan 3. In some embodiments, the fan can be installed instead of the flow resistance element 18. It may include a flow resistance element with motorized adjustment (with feedback).

The mass flow sensor 13 is simple to fit on the suction side of practically any system. The systems disclosed in FIG. 3 and FIG. 4 also compensate for changes in density of the air, as illustrated for FIG. 1. In each case the particle and/or mass flow 5 of the fluid through the burner 1 is established.

In some embodiments, the throughflow 15 in the side duct 28 is measured with a mass flow sensor 13. The mass flow sensor 13 is arranged in the feed duct/outflow duct 28. The mass flow sensor 13 may operate in accordance with the anemometer principle. In this principle an (electrically) operated heater heats the fluid. The heating resistance can simultaneously be used as a temperature measurement resistance. The reference temperature of the fluid is measured in a measuring element before the heating resistance. The reference temperature measuring element can likewise be designed as a resistor, for example in the form of a PT-1000 element. In some embodiments, heating resistor and reference temperature resistor are arranged on one chip. In this case the heating must be sufficiently thermally decoupled from the reference temperature measurement element.

The anemometer can be operated in one of at least two ways. In some embodiments, the heating resistor is heated with a constant, known heating power, heating voltage, and/or heating current. The difference temperature of the heater from the reference temperature measurement element is a measure for the throughflow (particle flow and/or mass flow) in the side duct 28. It is thus likewise a measure for the throughflow 5 (particle flow and/or mass flow) of the main flow.

In some embodiments, the heater is heated in a closed temperature-regulation circuit. A constant temperature of the heater is thus produced. The temperature of the heater is (apart from fluctuations through the regulation) equal to the temperature of the required value of the regulation circuit. The required value of the temperature of the heater is defined by a constant temperature difference being added to the measured temperature of the reference temperature measurement element. The constant temperature difference thus corresponds to the overtemperature of the heater in relation to the reference temperature measurement element. The power introduced into the heater is a measure for the throughflow (particle flow and/or mass flow) in the side duct 28. It is thus likewise a measure for the throughflow 5 (particle flow and/or mass flow) of the main flow.

Figure 5:
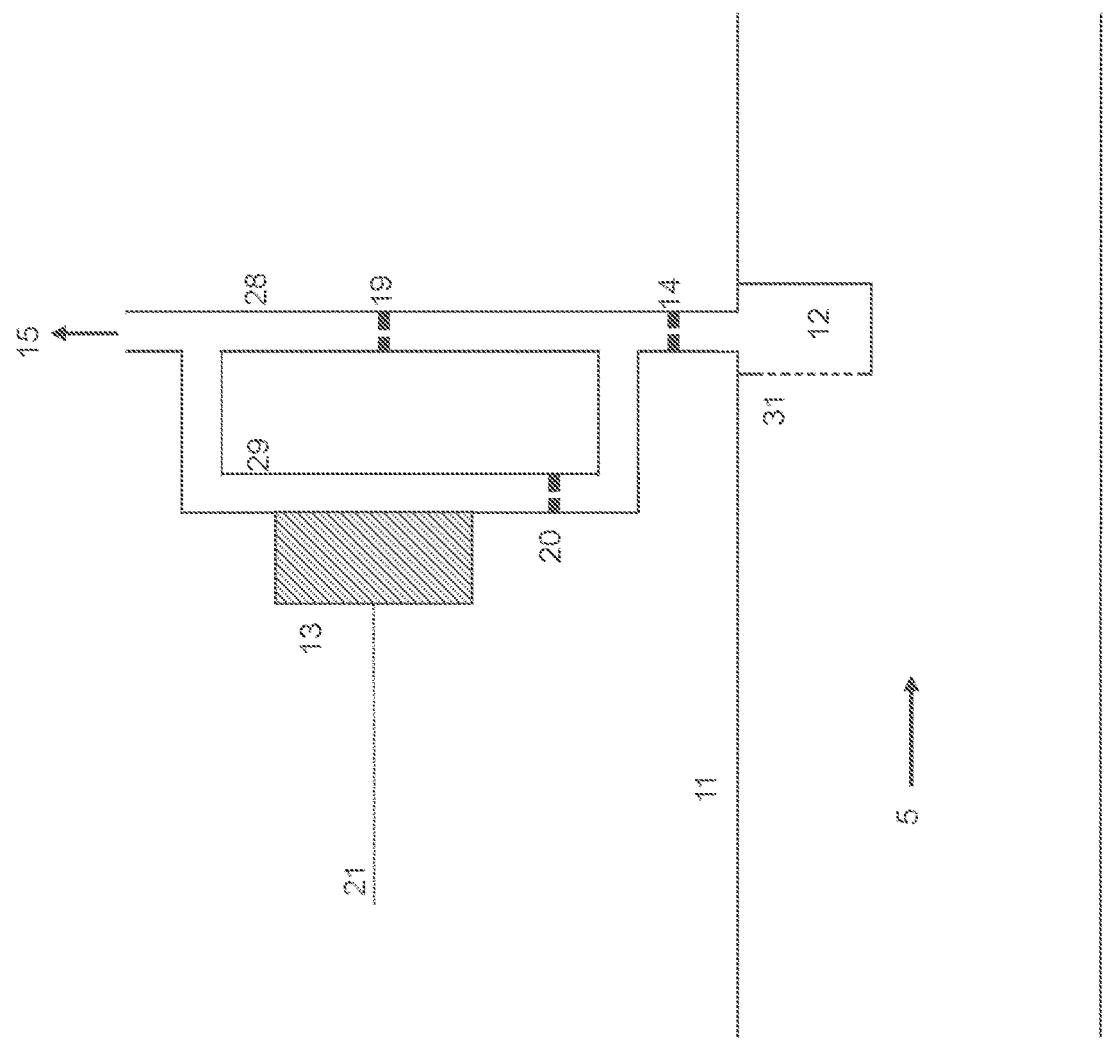
FIG. 5 shows a schematic of a side duct with bypass duct.

In some embodiments, the measurement range of the flow sensor corresponds to a small flow 15 in the side duct 28. Consequently, with a sufficiently high fan pressure, the admittance surface of the flow resistance element 14, which determines the throughflow 15, must be designed small. With such small admittance surfaces the danger exists that the flow resistance element 14 will be blocked by suspended particles. FIG. 5 teaches how a pressure divider with bypass duct 29 can be constructed in such cases.

In some embodiments, a second flow resistance element 19 with a larger admittance surface then lies behind the first flow resistance element 14. Thus, the pressure is divided between the two flow resistance elements 14 and 19. The admittance surfaces of the flow resistance elements 14 and 19 determine the division of the pressure. Arranged before the mass flow sensor 13 in the bypass duct 29 is a further flow resistance element 20. An admittance surface area of the flow resistance element 20 may be adapted to the mass flow sensor 13. With the sub-flow divider constructed in this way the throughflow 5 (particle flow and/or mass flow) through duct 11 can then be deduced (reversibly unambiguously).

In some embodiments, a fault-tolerant version of the measurement process the mass flow sensor 13 can be realized with (dual) redundancy with result comparison. The dual design initially involves the mass flow sensor 13 itself as well as the signal-processing device. The result comparison can then be carried out in secure hardware and/or software at the location of the sensor and/or in the closed-loop and/or open-loop control and/or monitoring device 16. In some embodiments, the side duct 28 is realized with (dual) redundancy. In some embodiments, each redundant side duct 28 present comprises a flow resistance element 14. This allows faults caused by blocked flow resistance elements 14 to be uncovered. The branch for the second side duct may lie between flow resistance element 14 and Pitot probe 12. The Pitot probe 12 can be assumed to be fault-tolerant on account of the large openings 31.

In some embodiments, other faults such as formation of deposits on the mass flow sensor 13, scratches and/or other damage, which have an influence on the measurement signal, can be recognized. The (dual) redundant structure of the signal-processing device also enables faults in the signal-processing device to be recognized. In accordance with one form of embodiment the measurement values of the redundant mass flow sensors 13 present, preferably with formation of average values in each case, are compared with each other by subtraction. The difference Δ then lies within a threshold value band $$-\varepsilon_1 \leq \Delta \leq \varepsilon_2$$

with the limits $\varepsilon_1$ and $\varepsilon_2$. With the aid of a characteristic curve of the respective limit values $\varepsilon_1$ and $\varepsilon_2$ over the required value of the air flow 5, the difference Δ can then be compared and evaluated for each required value of the air flow 5.

In some embodiments, parts of closed-loop control devices or of methods can be realized as hardware, as a software module, which is executed by a computer unit, or on a Cloud computer, or on the basis of a combination of the aforementioned options. The software might comprise firmware, a hardware driver, which is executed within an operating system, and/or an application program.

The present disclosure thus relates to a computer program product, which contains the features of this disclosure or carries out the required steps. In a realization as software the described functions can be stored as one or more commands on a computer-readable medium. A few examples of computer-readable media include random access memory (RAM), magnetic random access memory (MRAM), read only memory (ROM), flash memory, electronically programmable ROM (EPROM), electronically programmable and erasable ROM (EEPROM), registers of a computer unit, a hard disk, a removable storage unit, an optical memory, or any other suitable medium that can be accessed by a computer or by other IT devices and applications.

The aforementioned relates to individual forms of embodiment of the disclosure. Various changes to the forms of embodiment can be made without deviating from the underlying idea and without departing from the framework of this disclosure. The subject matter of the present disclosure is defined via its claims. A wide variety of changes can be made without departing from the scope of protection of the following claims.

REFERENCE CHARACTERS

1 Burner
2 Heat consumer (heat exchanger), in particular combustion chamber
3 Fan
4 Flap or valve (with motorized adjustment)
5 Fluid flow (mass flow) in main duct, air flow, air throughflow
6 Fluid flow of a combustible fluid, fuel throughput
7, 8 Safety valve
9 Flap or valve (with motorized adjustment)
10 Waste gas flow, exhaust gas flow
11 Feed duct (air duct)
12 Connector
13 Mass flow sensor
14 Flow resistance element (diaphragm)
15 Throughflow (flow, mass flow) in the side duct
16 Closed-loop and/or open-loop control and/or monitoring device
17 Mixing device
18, 19, 20 Flow resistance elements (diaphragms)
21-26 Signal lines
27 Air inlet
28 Side duct
29 Bypass duct
30 Waste gas duct
31 Openings of the Pitot probe

The invention claimed is:

1. A combustion device comprising:
a burner;
a combustion chamber with a fluid connection to the burner;
a side duct; and
a feed duct with a connector for the side duct;
the feed duct including an inlet and an outlet;
wherein the inlet lets a fluid flow into the feed duct;
the outlet lets the fluid flow out of the feed duct into the burner;
wherein the side duct comprises: a mass flow sensor, an inlet, an outlet, and a flow resistance element;
the inlet of the side duct connects to the connector so that the side duct and the feed duct have a fluid connection to one another;
the mass flow sensor detects a signal corresponding to a mass flow of the fluid through the side duct;
the resistance element subdivides the side duct into a first section facing away from the mass flow sensor and a second section facing towards the mass flow sensor;
the resistance element includes an admittance surface for passage of the fluid between the first and the second section;

the combustion device comprises an outer area arranged outside of the side duct, the feed duct, the burner, and the combustion chamber;

wherein the mass flow sensor projects into the side duct; and the outlet of the side duct lets the fluid flow out of the side duct directly into the combustion chamber or directly into the outer area.

2. The combustion device as claimed in claim 1, wherein:

the connector comprises a probe having an inlet and an outlet;

at least part of the probe projects into the feed duct and the inlet of the probe lets the fluid flow from the feed duct into the probe;

the outlet of the probe lets the fluid flow out of the probe into the side duct; and the inlet of the probe has an admittance surface for the passage of the fluid between feed duct and the probe.

3. The combustion device as claimed in claim 2, wherein:

the inlet of the probe has a number of openings each for allowing passage of the fluid between the feed duct and an interior of the probe; and a diameter of each individual opening blocks suspended particles in a mass flow in the feed duct from entering the interior of the probe.

4. The combustion device in accordance with claim 1, wherein:

the side duct includes a bypass duct and a second flow resistance element;

the second flow resistance element subdivides the side duct into a third section facing towards the at least one flow resistance element and a fourth section facing away from the flow resistance element; and the bypass duct branches off from the section of the side duct to form a fluid connection to the third section.

5. The combustion device as claimed in claim 4, wherein the mass flow sensor projects into the bypass duct.

6. The combustion device as claimed in claim 4, wherein the bypass duct includes a third flow resistance element arranged in the bypass duct.

7. The combustion device as claimed in claim 1, wherein the outlet of the side duct provides a fluid connection to the combustion chamber.

8. The combustion device as claimed in claim 1, further comprising an environment surrounding the burner and the combustion chamber from the outside;

wherein the outlet of the side duct provides a fluid connection to the environment.

9. The combustion device as claimed in claim 1, further comprising a signal-processing device with a lowpass filter connected to the mass flow sensor;

wherein the lowpass filter filters the signal of the mass flow sensor.

10. The combustion device as claimed in claim 9, wherein the lowpass filter is of an adaptive design.

11. The combustion device as claimed in claim 1, comprising a fan and a control or monitoring device, wherein the control or monitoring device is connected to the mass flow sensor.

* * * * *